(12) United States Patent
Weisenberg (10) Patent No.: US 10,837,588 B2
(45) Date of Patent: Nov. 17, 2020

(54) PIPE LINING APPARATUS TRANSPORT ASSEMBLIES

(71) Applicant: Sipp Technologies, LLC, Wichita, KS (US)

(72) Inventor: Kent Weisenberg, Fruit Cove, FL (US)

(73) Assignee: SIPP TECHNOLOGIES, LLC, Wichita, KS (US)

( * ) Notice: Subject to any disclaimer, the term of this patent is extended or adjusted under 35 U.S.C. 154(b) by 93 days.

(21) Appl. No.: 16/253,654

(22) Filed: Jan. 22, 2019

(65) Prior Publication Data
US 2019/0226620 A1 Jul. 25, 2019

Related U.S. Application Data

(60) Provisional application No. 62/620,171, filed on Jan. 22, 2018, provisional application No. 62/635,794, filed on Feb. 27, 2018.

(51) Int. Cl.
| | |
|---|---|
| *F16L 55/1645* | (2006.01) |
| *F16L 55/32* | (2006.01) |
| *F16L 55/18* | (2006.01) |
| *B05B 13/06* | (2006.01) |
| *F16L 55/164* | (2006.01) |
| *B05C 7/02* | (2006.01) |
| *F16L 101/16* | (2006.01) |

(52) U.S. Cl.
CPC ...... *F16L 55/1645* (2013.01); *B05B 13/0636* (2013.01); *B05C 7/02* (2013.01); *F16L 55/164* (2013.01); *F16L 55/18* (2013.01); *F16L 55/32* (2013.01); *F16L 2101/16* (2013.01); *Y10S 118/10* (2013.01)

(58) Field of Classification Search
CPC ....... F16L 55/1645; F16L 55/32; F16L 55/18; F16L 55/164; F16L 2101/16; B05B 13/0636; B28B 19/0023; B05C 7/02; Y10S 118/10; B29C 63/26; B29C 63/32
USPC .......................................................... 118/306
See application file for complete search history.

(56) References Cited

U.S. PATENT DOCUMENTS

| 4,921,732 A | 5/1990 | Bounds |
|---|---|---|
| 2011/0097486 A1 | 4/2011 | Weisenberg |
| 2014/0251206 A1* | 9/2014 | Kim .................. B05B 3/02 |
| | | 118/306 |

FOREIGN PATENT DOCUMENTS

WO 2017215810 A1 12/2017

* cited by examiner

*Primary Examiner* — Laura Edwards
(74) *Attorney, Agent, or Firm* — Thomas C. Saitta (57) ABSTRACT

A pipe lining apparatus transport assembly having one or more positioning mechanisms for maintaining the orbiting operational components of the pipe lining apparatus in a concentric relationship with the pipe, the positioning mechanisms including alone or in combination extension/retraction mechanisms, track set rotational mechanisms, articulating joint mechanisms and/or linear translation mechanisms.

18 Claims, 10 Drawing Sheets

PIPE LINING APPARATUS TRANSPORT ASSEMBLIES

BACKGROUND OF THE INVENTION

This invention relates generally to internal pipe lining rehabilitation devices or systems, and more specifically relates to lining systems that are adapted and adaptable for use in the structural repair or remediation of degraded, damaged or leaking pipes, or such lining systems adapted and adaptable to improve or upgrade qualities and characteristics of pipes prior to or after use or installation. Even more specifically, this invention relates to lining systems having primary pipe lining apparatuses which spray a lining and/or helically or axially apply reinforcing filaments onto the internal pipe surface for rehabilitation or remediation of an existing host pipe, as well as to auxiliary pipe lining apparatuses which apply tape to cracks, plug small openings in the pipe wall, transport liner material, etc. The term pipe lining apparatus shall be used herein to refer to both primary and auxiliary pipe line apparatuses, whether non-powered and pulled through a pipe or self-propelled. Most particularly, this invention relates to transport assemblies for such pipe lining apparatuses which are structured to account for the non-planar, curved lower pipe surface on which the pipe lining apparatuses are supported and to account for curved or angled bends in the pipe.

Lining systems for pipe rehabilitation that spray a liner onto the internal surface of a pipe in need of repair whereupon the liner cures to form a "pipe-within-a-pipe", are typically referred to by the acronym SIPP, which stands for Spray-In-Place-Pipe. Pipe rehabilitation rather than pipe replacement is practiced heavily in industrial and municipal water markets due to two primary advantages. Firstly, the cost of pipe rehabilitation is significantly cheaper than pipe replacement. Secondly, pipe rehabilitation is far less of an invasive practice than replacement. For instance, replacing a pipeline running under a major road or building results in a major disruption to a community and in some cases, is not a feasible solution. Thus, pipe rehabilitation methods are a highly valued solution and far more desirable in many situations.

Structural (i.e., self-defined, stand-alone or self-sustaining) linings installed by polymeric spray or SIPP devices for piping systems are currently without an industry installation standard. The difficulty in setting design standards arises because of the many different types of lining faults, such as ringing, puddling, thickness inconsistencies and lining voids, which result from current rehabilitation methods. These lining faults are a direct result of the past manufacturers inability to overcome the mechanical function insufficiencies of the SIPP or similar equipment that are the direct causation of these faults.

Many common SIPP devices utilize an accumulator reel to retract an umbilical or tether tensile member (the term "umbilical" being used hereafter to refer collectively to an umbilical, tether, tension member or similar tensile structure or combination of such members, the umbilical containing or further comprising material, electrical and communication transmission or conduit members) to which the pipe lining apparatuses are serially attached or mounted.

As the pipe lining material and reinforcing filaments are applied onto the interior of a circular wall, typically with applicator devices that rotate about the longitudinal central axis of the pipe lining apparatus, it is most advantageous and desirable during movement of the pipe lining apparatus through the pipe to maintain the central axis of the pipelining apparatus coaxial to the longitudinal central axis of the pipe, such that the distance to the pipe wall is equal over 360 degrees. Failure to do this may result in improper application of the lining material and/or the reinforcing filaments.

As pipes are circular in cross-section, the internal wall is likewise circular, and the pipe lining apparatuses must travel along a curved, non-planar surface. The design of the transport assemblies, that is the assembly that comprises wheels, rollers, tracks or the like, must take this support surface configuration into account. The supporting surfaces may also present bumps, ridges, joints or other imperfections in the path of the transport assemblies, and this problem must be accounted for in order to maintain the pipe lining apparatuses, and particularly the operational components of the primary pipe lining apparatuses which apply the liner material or the reinforcing filaments, axially centered within the pipe during the application process. Another problem is caused by bends in the pipe, whether angled or curved, turning laterally right or left, or inclining up or down. The transport assembly of typical pipe lining apparatuses comprises a set of paired rollers, belts or tracks, the sets being spaced apart longitudinally along the direction of travel, similar to the wheels of a car. During passage of the pipe lining apparatuses through a bend, the axial orientation of the operational components of the pipe lining apparatuses will shift away from the optimal position on the central pipe axis, which will result in a misapplication of lining material or reinforcing filament.

It is an object of this invention to provide pipe lining apparatuses having transport assemblies that address the problems resulting from internal pipe imperfections and pipe bends, such that the operational components of the pipe lining apparatuses remain properly positioned relative to the central axis of the pipe when such imperfections or bends are encountered. It is a further object to provide such pipe lining apparatus transport assemblies that utilize extension/retraction, pivotal movement, rotational movement and/or linear translational movement to accomplish this purpose.

SUMMARY OF THE INVENTION

In general, the invention in its various embodiments is a pipe lining apparatus comprising a transport assembly. The pipe lining apparatus transport assembly comprises two sets of paired wheels, rollers, belts, tracks or the like, to be referred to herein collectively as tracks, the track sets being longitudinally separated along the longitudinal axis of the pipe lining apparatus such that the track sets are positioned forward and rearward as the pipe lining apparatus moves through the pipe.

A track set may comprise a single extension/retraction mechanism, such as a telescoping column able to extend and retract in the radial direction, to which both tracks are connected, or a track set may comprise a pair of extension/retraction mechanisms, such as two telescoping column able to extend and retract in the radial direction, wherein a track is connected to each such extension/retraction mechanism. The tracks of each track sets are disposed at an angle to account for the curvature of the pipe surface, and the track separation angles of the two track sets on a given pipe lining apparatus may be the same or different. The tracks are pivotally mounted to the extension/retraction mechanisms by a rocker mechanism or suspension such that each track may rock up and down relative to a central pivot. Spring members are preferably provided for shock absorption as the tracks pass over imperfections in the pipe wall.

In embodiments having a track set is positioned at the front and at the rear of the operational components of a pipe lining apparatus, each track set is rotationally mounted to a transport assembly bracket member by a rotating mounting mechanism having a vertical central axis. In this manner the track set may be rotated about the central, vertical axis of the rotational mounting mechanism to account for left or right turns in the pipe. In other embodiments having both track sets positioned to the front or rear of the operational components of a pipe lining apparatus, the track sets are connected to each other by a bridging member extending between the track sets which may comprise an articulating joint mechanism that allows the two segments of the bridging member to either side of the articulating joint mechanism to angularly pivot relative to each other within the horizontal plane. With these structures, the travel direction of the track sets may be altered independently of each other.

Each of the track sets of the transport assembly may further comprise or be mounted to a linear translation mechanism that allows each track set to move laterally in the horizontal direction relative to the central axis of the pipe lining apparatus.

Certain elements of the transport assemblies will be controlled by processing units receiving information from sensor devices, such as proximity sensors, cameras, and/or LIDAR or the like mounted on the pipe lining apparatuses, such that extension/retraction, rotation and/or linear translation will be actuated, preferably autonomously, in response to changes in diameter or direction of the pipe in order to maintain the pipe lining apparatus in the desired axially aligned or concentric orientation relative to the pipe axis as the pipe lining apparatus moves through the pipe.

In alternative format, the invention is described and defined as a pipe lining apparatus comprising operational components applying lining material and/or reinforcing filaments to the interior of a pipe; a transport assembly comprising two track sets, each said track set comprising a pair of laterally separated tracks connected to one or more extension/retraction mechanisms, said track sets connected to said operational components; a track set rotational mechanism connected to each said track set and having a vertical axis, whereby said track sets rotate about said vertical axis relative to said operational components. And furthermore, such apparatus further comprising one or more linear translation mechanisms moving one or more of said track sets laterally relative to said operational components; wherein said tracks are connected to said extension/retraction members by a rocker mechanism; wherein said track sets are connected to a bridging member; further comprising an articulating joint mechanism dividing said bridging member into two articulating segments; wherein each of said extension/retraction mechanisms and each of said track set rotational mechanisms operate independently of each other; wherein each of said extension/retraction mechanisms, each of said track set rotational mechanisms, and each of said one or more linear translation mechanisms operate independently of each other; wherein said operational components are positioned between said track sets; and/or wherein one of said track sets is positioned between said operational components and the other of said track sets.

Otherwise, the invention is described and defined as a pipe lining apparatus comprising operational components applying lining material and/or reinforcing filaments to the interior of a pipe, said operational components having a central axis, wherein said operational components apply said lining material and/or reinforcing filaments to the interior of the pipe in an orbital manner centered on said central axis; a transport assembly comprising two track sets, each said track set comprising a pair of laterally separated tracks connected to one or more extension/retraction mechanisms, said track sets connected to said operational components; a track set rotational mechanism connected to each said track set and having a vertical axis, whereby said track sets rotate about said vertical axis relative to said operational components; one or more linear translation mechanisms moving one or more of said track sets laterally relative to said central axis of said operational components; wherein said transport assembly adjusts the position of said central axis of said operational components within the pipe such that said central axis is concentric with said pipe. And furthermore, such apparatus wherein said tracks are connected to said extension/retraction members by a rocker mechanism; wherein said one or more extension/retraction members comprise telescoping sleeve members; wherein said one or more linear translation members comprise a turn screw actuated by a motor, said turn screw retained by a mounting bracket connected to said operational components, and a platform connected to said turn screw and to at least one of said track sets, whereby rotation of said turn screw moves said turn set laterally relative to said central axis; wherein each of said extension/retraction mechanisms and each of said track set rotational mechanisms operate independently of each other; and or wherein each of said extension/retraction mechanisms, each of said track set rotational mechanisms, and each of said one or more linear translation mechanisms operate independently of each other.

DETAILED DESCRIPTION OF THE INVENTION

With reference to the drawings, which are provided for descriptive, disclosure, enablement and illustrative purposes, it being intended that the drawings be non-limiting as to the scope and definition of the invention, the invention is shown in various embodiments as comprising in general a pipe lining apparatus 90 having a transport assembly 10 designed to account for and address problems resulting from pipe wall imperfections and bends, the pipe lining apparatus 90 having operational components 91 structured for and functioning to apply lining material and/or reinforcing filaments in a rotational, orbital or helical manner to the interior of a pipe 100, and/or perform other remedial or auxiliary operations. The operational components 91 of the pipe lining apparatus 90 are supported for movement within the pipe 100 being rehabilitated by the transport assembly 10 such that lining material and/or reinforcing filaments, or various other remedial or auxiliary operations, may be performed along the length of the pipe 100, the pipe lining apparatuses 90 being non-powered and pulled through the pipe or, preferably, being self-powered. The transport assemblies 90 function to maintain the central axis 99 of the operational components 91 coaxially aligned with the central axis of the pipe 100, i.e., to maintain the operational components 91 concentrically centered within the pipe 100 as the pipe lining apparatus 90 travels through the pipe 100.

In use, the transport assemblies 10 will extend beneath the operational components 91 such that the tracks 12 of the transport assemblies 10 support the operational components 91 and rest on lower arced interior surface of the pipe 100. As used in herein, directional terms such as vertical or horizontal shall be taken to be with reference to the pipe lining apparatus 90 when it is in use and situated within a horizontal section of the pipe 100, the directional terms being equated to the terms vertical and horizontal when associate with a flat ground surface. Terms such as forward, front, rear, and rearward reference the direction of travel of the pipe lining apparatus 90 during use. The pipe 100 is defined to possess a longitudinal, central axis, as do the operational components 91 of the pipe lining apparatus 90 based on the orbital movement of certain elements during application of lining material or reinforcing filaments, such that the axis 99 of the operational components 91 of the pipe lining apparatus 90 is coaxially and concentrically aligned with the axis of the pipe 100 in pipe sections during use.

FIGS. 1 through 5 illustrate an embodiment of a pipe lining apparatus 90 and transport assembly 10, with the pipe lining apparatus 90 having operational components 91 designed to apply reinforcing filaments to the interior of a pipe 100 in a helical manner, the reinforcing filaments being drawn from spools 92 and applied with rotating extension arms 93 that are centered about and extend in the radial direction from the central axis 99 of the operational components 91. FIGS. 6 through 10 illustrate a different embodiment of a pipe lining apparatus 90 and transport assembly 10, with this pipe lining apparatus 90 having operational components 91 designed to apply lining material to the interior of a pipe 100, the lining material being delivered through an umbilical member and applied with rotating applicator arms 94, such as spraying or expulsion mechanisms, that are centered about and extend in the radial direction from the central axis 99 of the operational components 91. Such operational components 91 are known in the art and are representative of various other designs and structures for operational components 91, such that the invention as claimed herein is not intended to be limited to the two operational components 91 illustrated and described.

Figure 7:
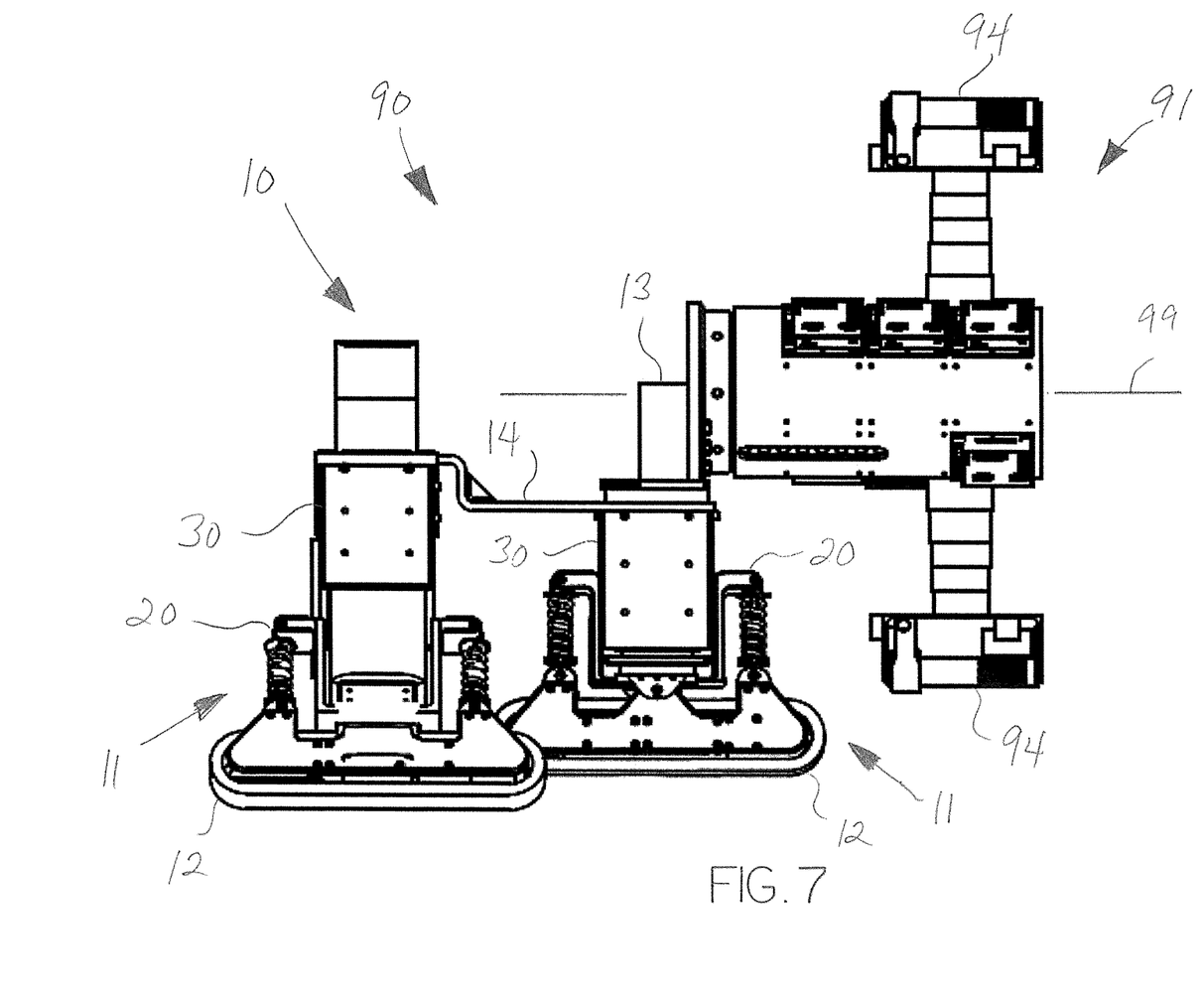
FIG. 7 is a side view of the embodiment of FIG. 6 showing the extension/retraction mechanisms in the fully retracted state.
Figure 8:
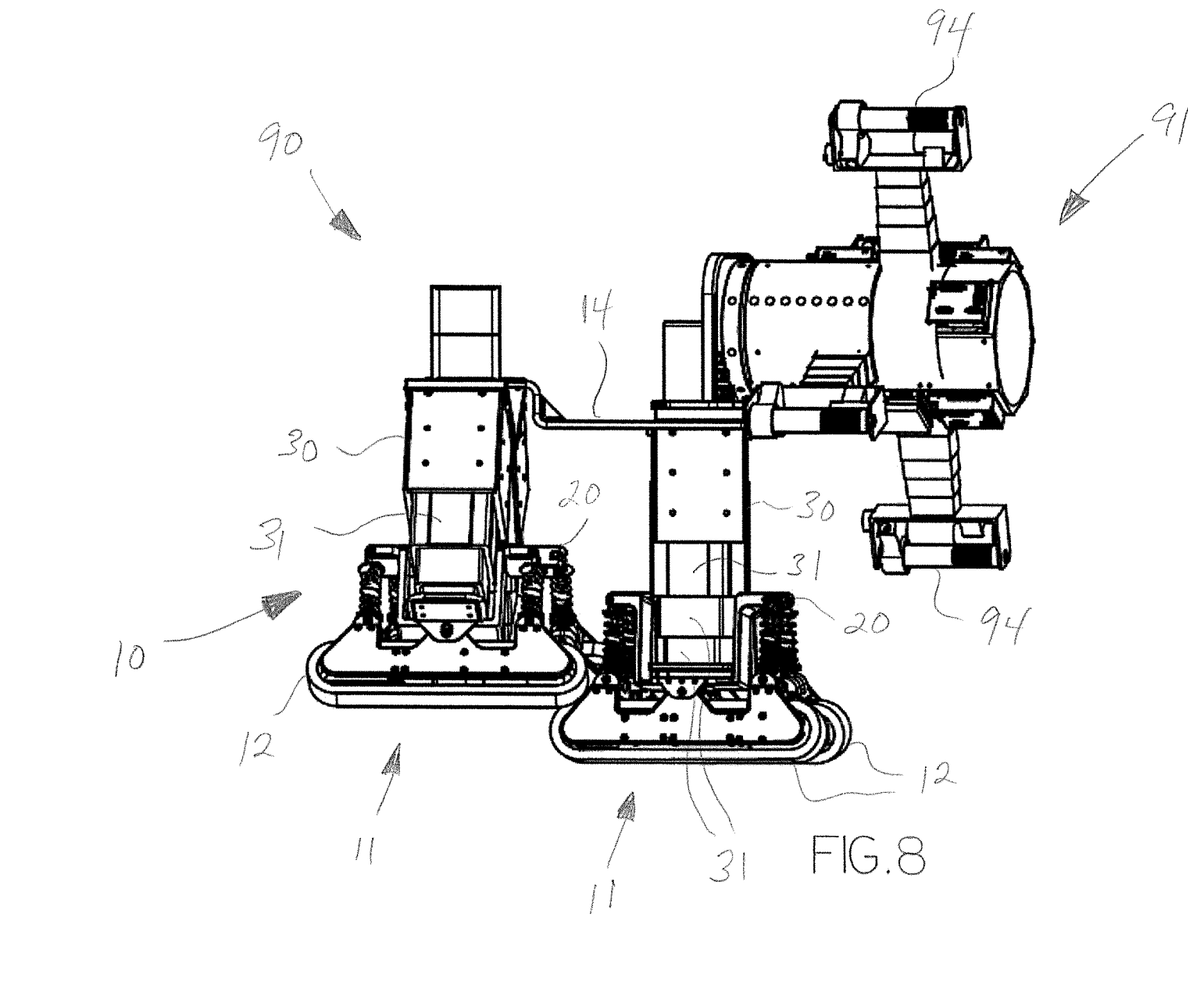
FIG. 8 is a perspective view of the embodiment of FIG. 6 showing the extension/retraction mechanisms in an extended state.

The transport assembly 10 comprises two track sets 11, each track set 11 having two tracks 12 which are separated transversely or laterally relative to the central axis 99. The tracks 12 are mounted on bearings, axles or the like such that they rotate in the travel direction in known manner. As shown best in FIG. 1, the tracks 12 are retained in a rocker mechanism 20 that comprises a central pivot 21 and a pair of spring members 22, such that the tracks 12 can rock or pivot about the central pivot 21 to ride over an obstruction or imperfection encountered in the pipe wall. The spring members 22 act to reposition the tracks 12 to maintain full contact with the pipe wall as well as to absorb shocks and reduce vibrations transmitted to the operational components 91. The rocker mechanisms 20 and tracks 12 are mounted onto an extension/retraction mechanism 30, which may comprise as shown a plurality of telescoping sleeve segments 31. Alternatively, a threaded rod or similar mechanism could be utilized to extend and retract the extension/retraction mechanisms. The extension/retraction mechanisms 30 allow the transport assembly 10 to adjust as required for pipes 100 of differing diameter, as shown in FIGS. 7 and 8, and also control centering of the operational components 91 when the pipe lining apparatus 90 passes through a vertical bend in the pipe 100.

Figure 6:
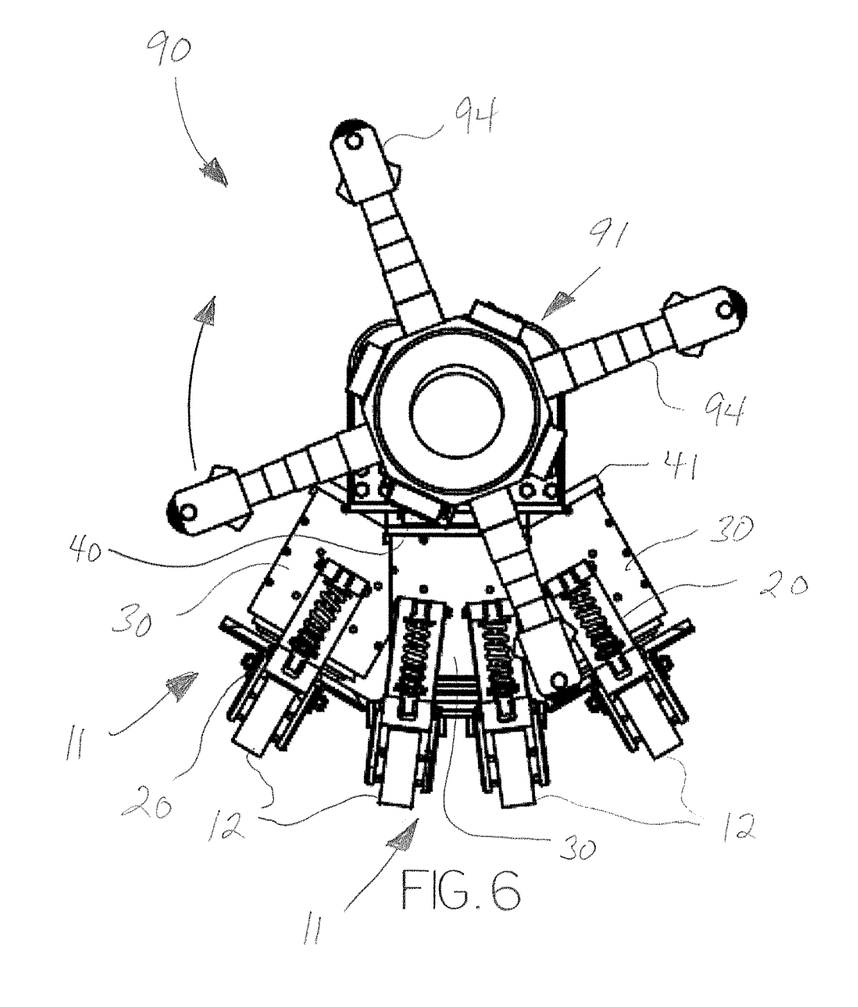
FIG. 6 is an end view of an embodiment of the pipe lining apparatus and transport assembly, the embodiment showing a pipe lining apparatus having operational components for spraying lining material onto a pipe wall.

As shown best in FIG. 6, a pair of tracks 12 and rocker mechanisms 20 may be mounted to a single extension/retraction mechanism 30, or each track 12 and its rocker mechanism 20 may be mounted to a dedicated extension/retraction mechanism 30. The tracks 12 in a track set 11 are angularly separated and oriented to accommodate the curvature of the pipe wall. The separation angle of each track set 11 may be the same or may be different, such that one track set 11 will have tracks 12, typically the front or forward set of tracks 12, which are separated a greater distance or number of degrees than the tracks 12 of the other track set 11, the rear set of tracks 12. The tracks 12 are mounted radially out of vertical such that the contact surface of the tracks 12 corresponds to the radial surface of the pipe wall. A representative transport assembly 10 may have one track set 11 having tracks 12 at 15 degrees of separation and the other track set 11 having tracks 12 at 60 degrees, for example.

Some or all of the extension/retraction mechanisms 30 are mounted to the operational components 91 by track set rotational mechanisms 40 structured to allow the track sets 11 to turn to the left or right about a vertical axis passing through the track set rotational mechanism 40 to account for horizontal bends in the pipe 100. The track set rotational mechanism 40 is oriented in the vertical direction and may comprise any suitable combination of bearings, rings or the like. For a track set 11 having a pair of extension/retraction mechanisms 30, the extension/retraction mechanisms 30 are connected to each other by a rotational bracket 41, with the rotational bracket 41 being joined to the track set rotational mechanism 40 such that both tracks 12 turn in tandem. The track set rotational mechanisms 40 may be motor or actuator controlled or may be free pivoting in response to changes in pipe orientation.

Figure 1:
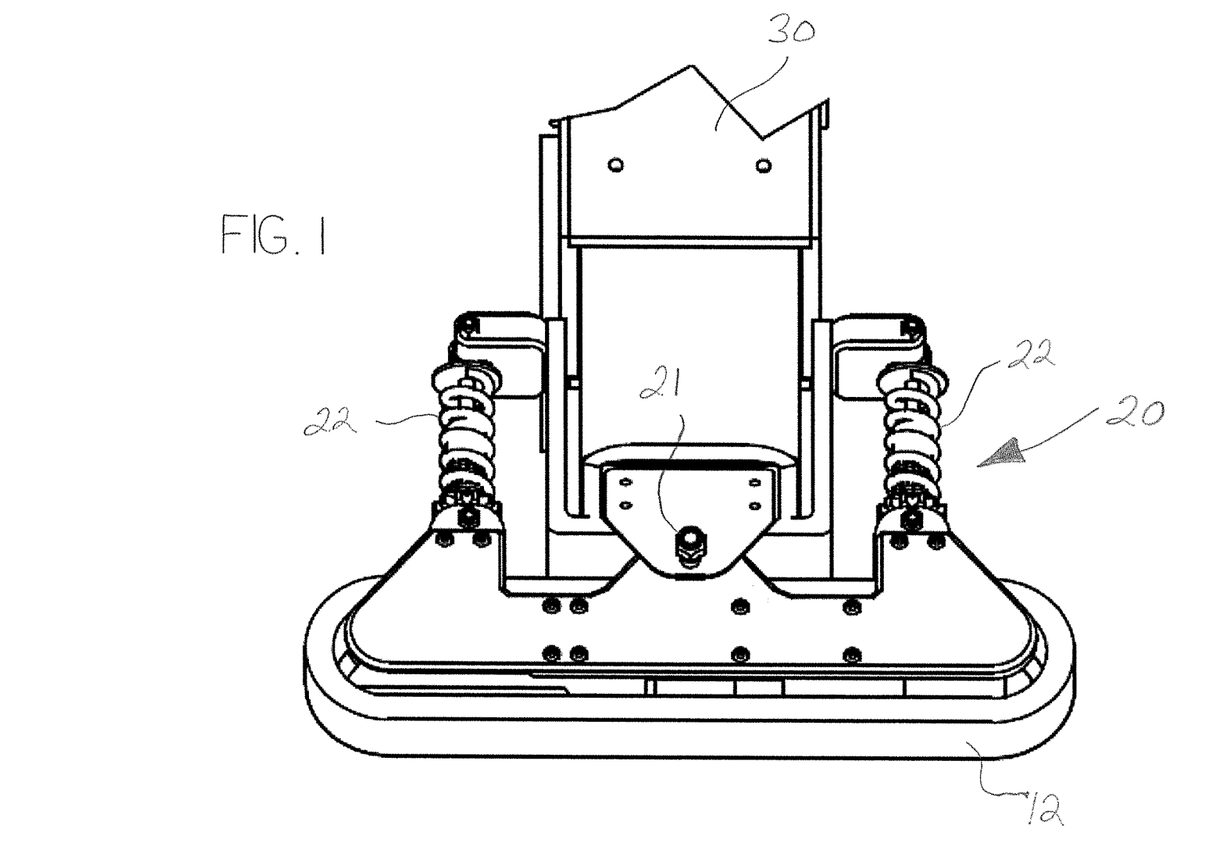
FIG. 1 is a perspective view of an embodiment of the pipe lining apparatus transport assembly showing a track member and rocker mechanism mounted onto an extension/retraction mechanism.
Figure 2:
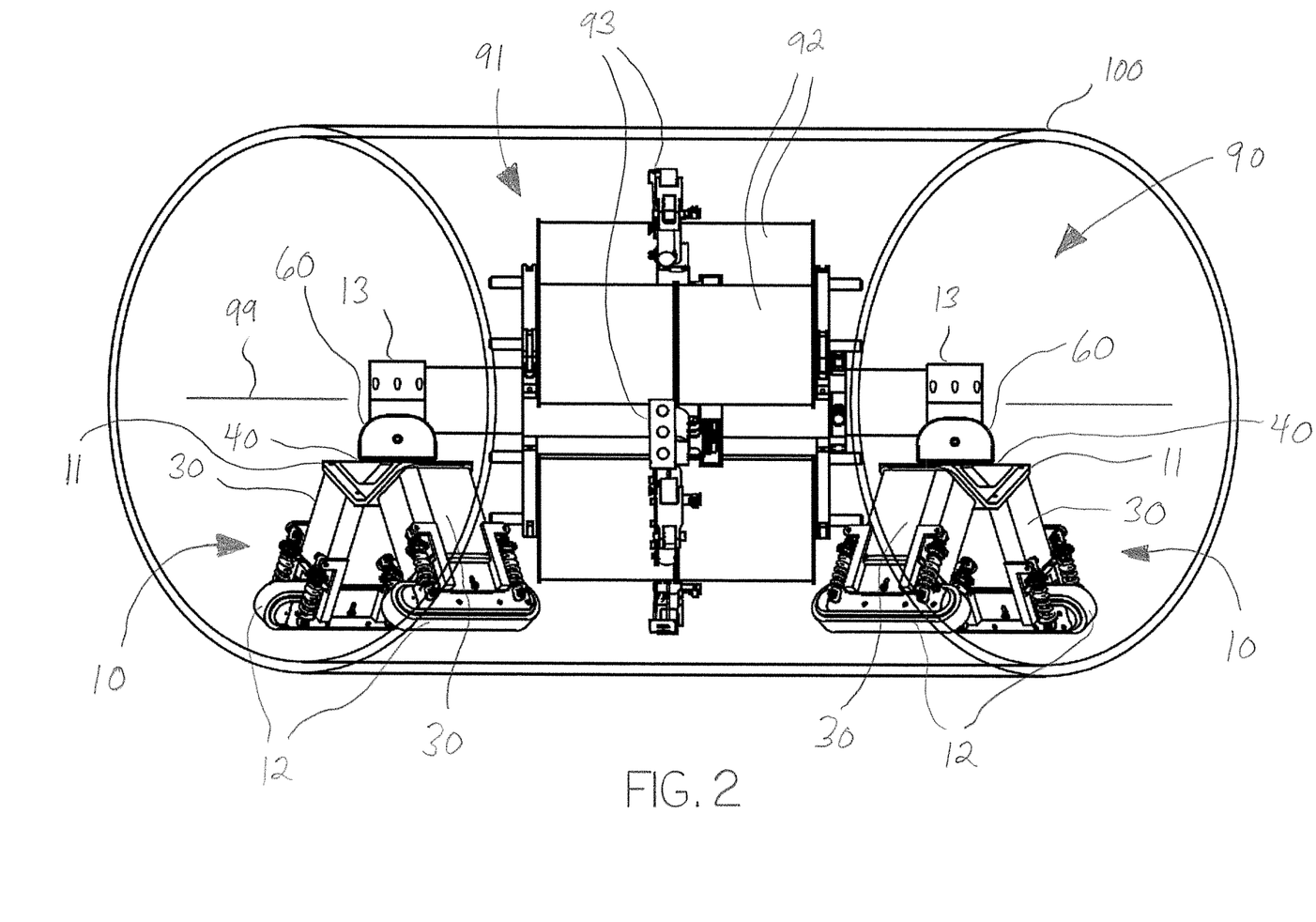
FIG. 2 is a side view of an embodiment of the pipe lining apparatus and transport assembly passing through a curved bend in a pipe, the embodiment showing a pipe lining apparatus having operational components for applying reinforcing filament to a pipe wall.
Figure 3:
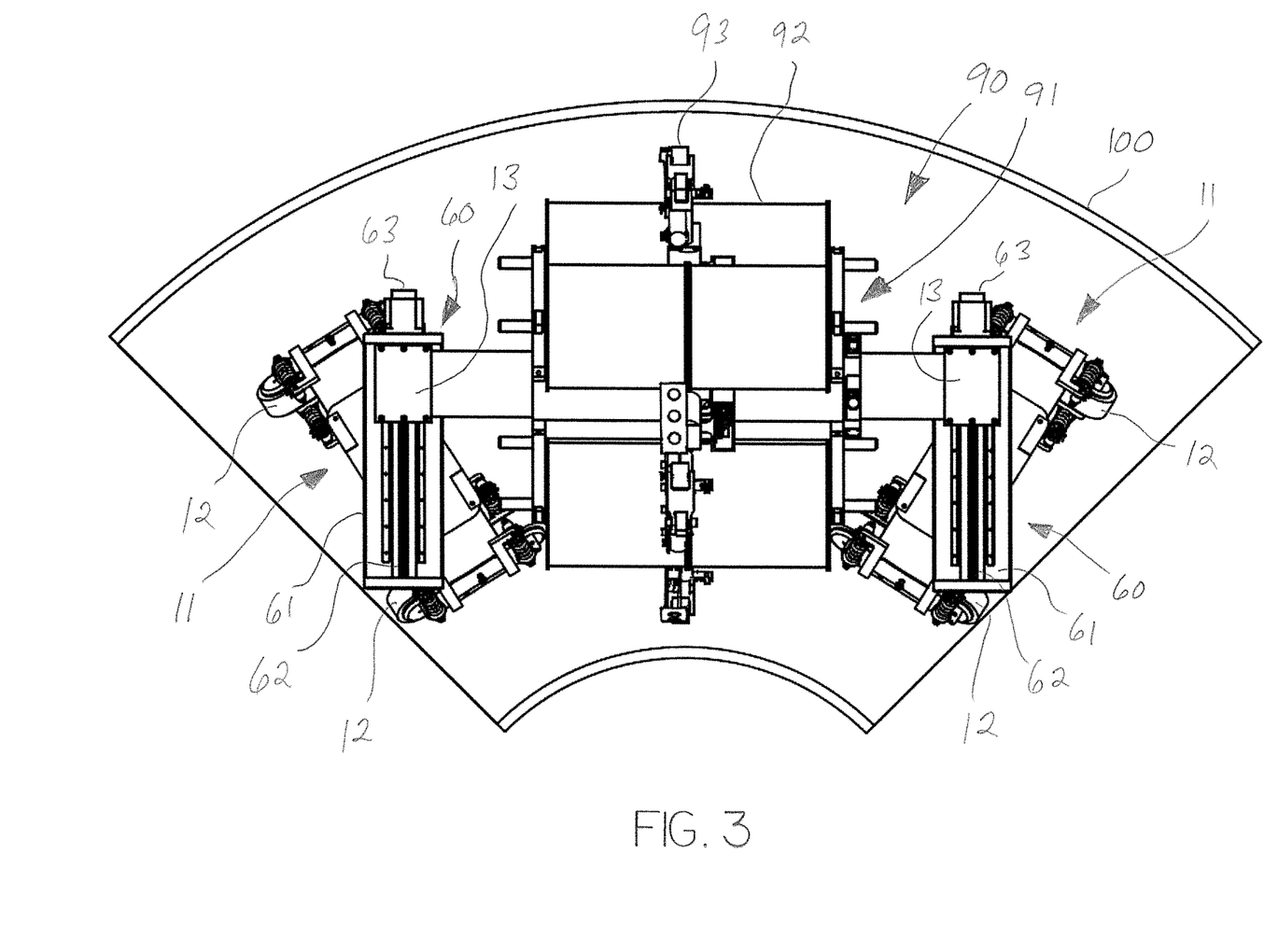
FIG. 3 is a top view of the embodiment of FIG. 2 passing through a curved bend in a pipe.
Figure 4:
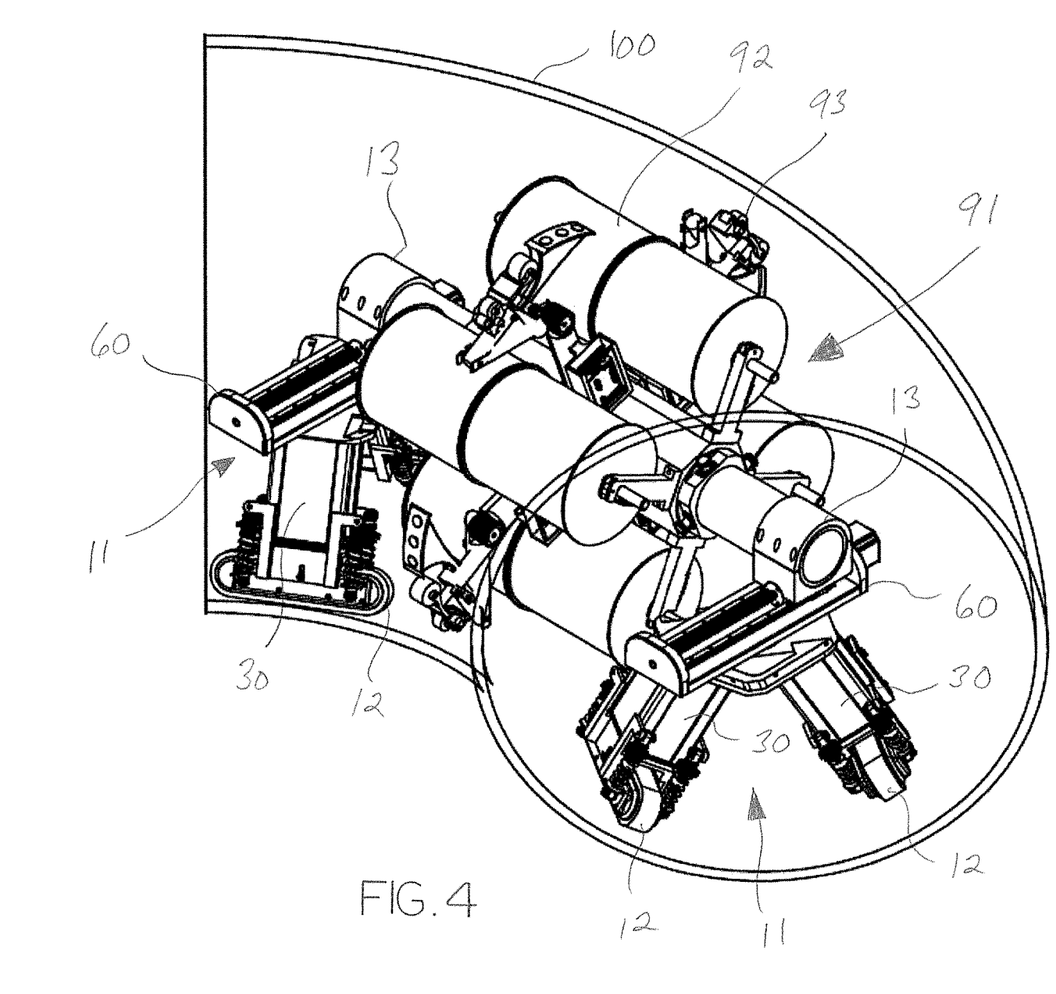
FIG. 4 is a perspective view of the embodiment of FIG. 2 passing through a curved bend in a pipe.
Figure 5:
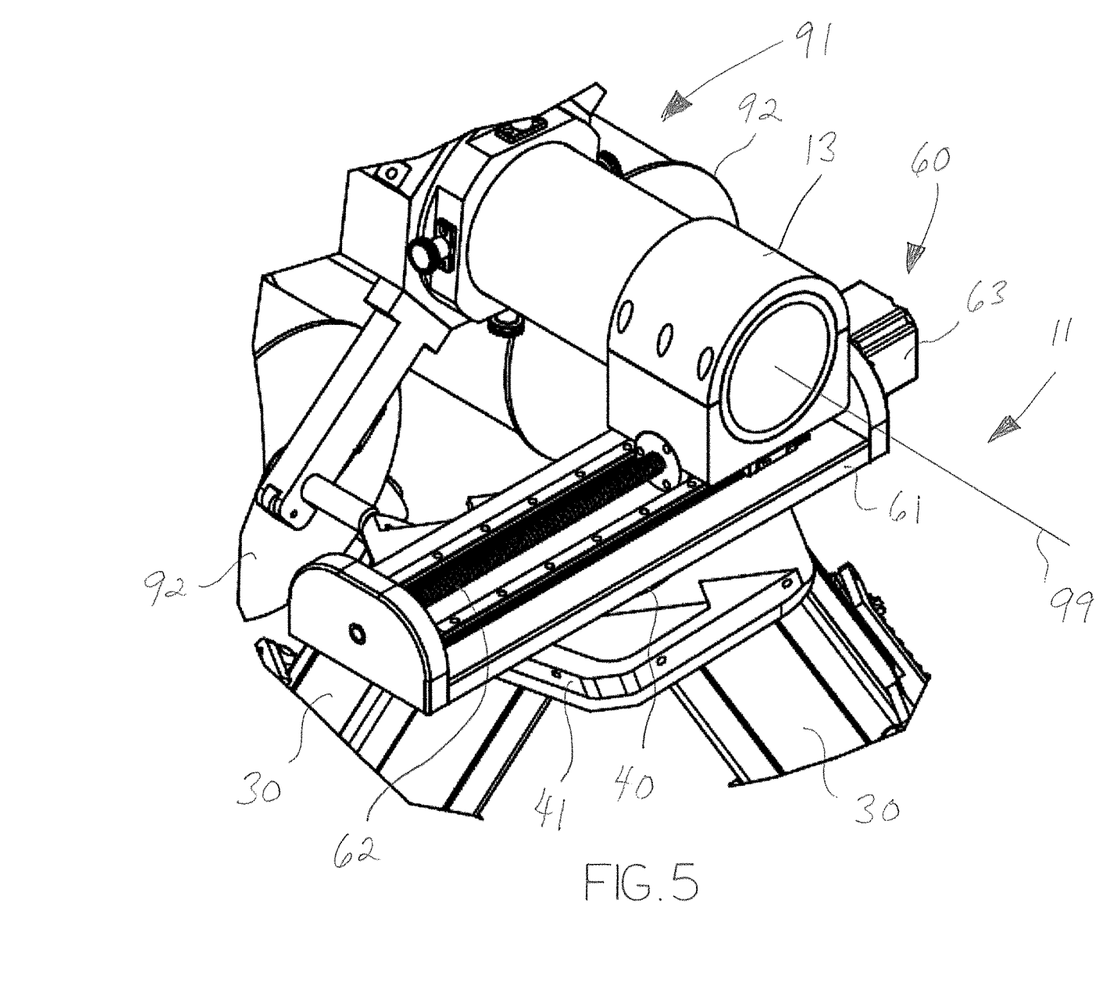
FIG. 5 is an illustration of an embodiment of a linear translation mechanism and track set.

As shown best in FIG. 5, the transport assembly 10 preferably further comprises a linear translation mechanism 60, which is designed and structured to accommodate left and right bends in the pipe 100, as shown in FIGS. 2 through 4. The linear translation mechanism 60 allows for horizontal linear movement of the track sets 11 in the transverse or lateral direction, i.e., the horizontal direction perpendicular to the central axis 99. In the embodiment shown, the linear translation mechanism 60 comprises a turn screw or threaded rod 62 mounted onto the mounting bracket 13 and connected to the platform 61. The track set rotational mounting mechanism 40 is connected to the platform 61. In this manner, when the turn screw 62 is rotated by a motor or similar actuator 63, the platform 61 and track set 11 move laterally relative to the central axis 99. As shown best in FIG. 3, linear translation of the track sets 11 relative to the operational components 91 when the pipe lining apparatus 90 is passing through a horizontal bend in the pipe 100, in combination with independent rotation of the track sets 11 such that their direction of travel is different, allows the operational components 91 to remain concentrically centered within the pipe 100, such that the central axis 99 at the point where liner material is being applied to the pipe 100 is equidistant from the all points on the pipe wall circumference.

A similar result—centering the operational components 91 within the pipe 100—is accomplished in an upward or downward bend in a pipe 100 by extension and retraction of the extension/retraction mechanisms 30 to account for the elevation and angular changes as the pipe lining apparatus 90 passes through the upward or downward bend. A bend in the pipe 100 in both the horizontal and vertical directions is addressed by actuating the linear translation mechanisms 60, the track set rotational mounting mechanisms 40 and/or the extension/retraction mechanisms 30 as required.

Figure 9:
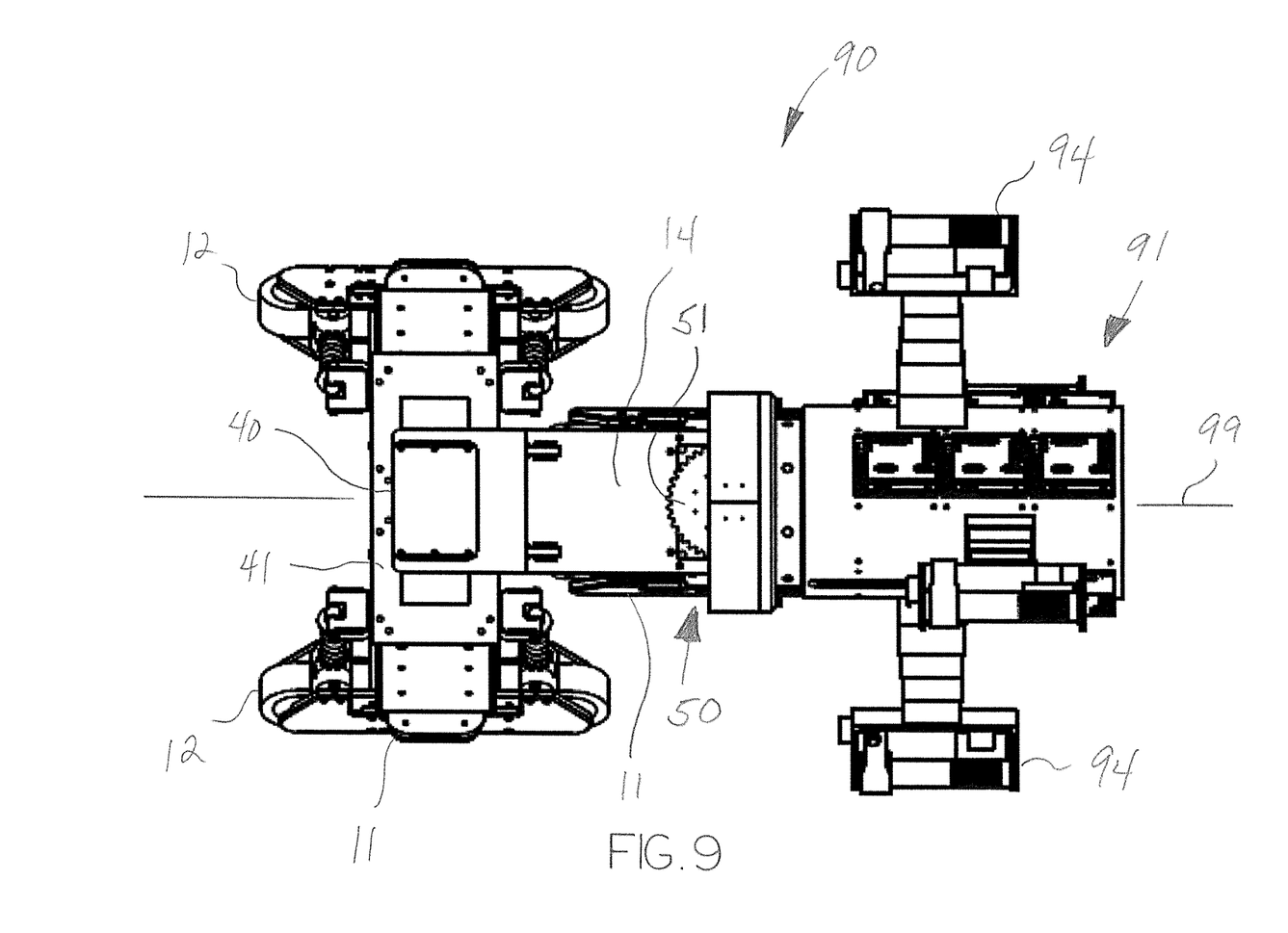
FIG. 9 is a top view of the embodiment of FIG. 6 showing the horizontal articulating joint mechanism with the bridging member in a linear orientation.
Figure 10:
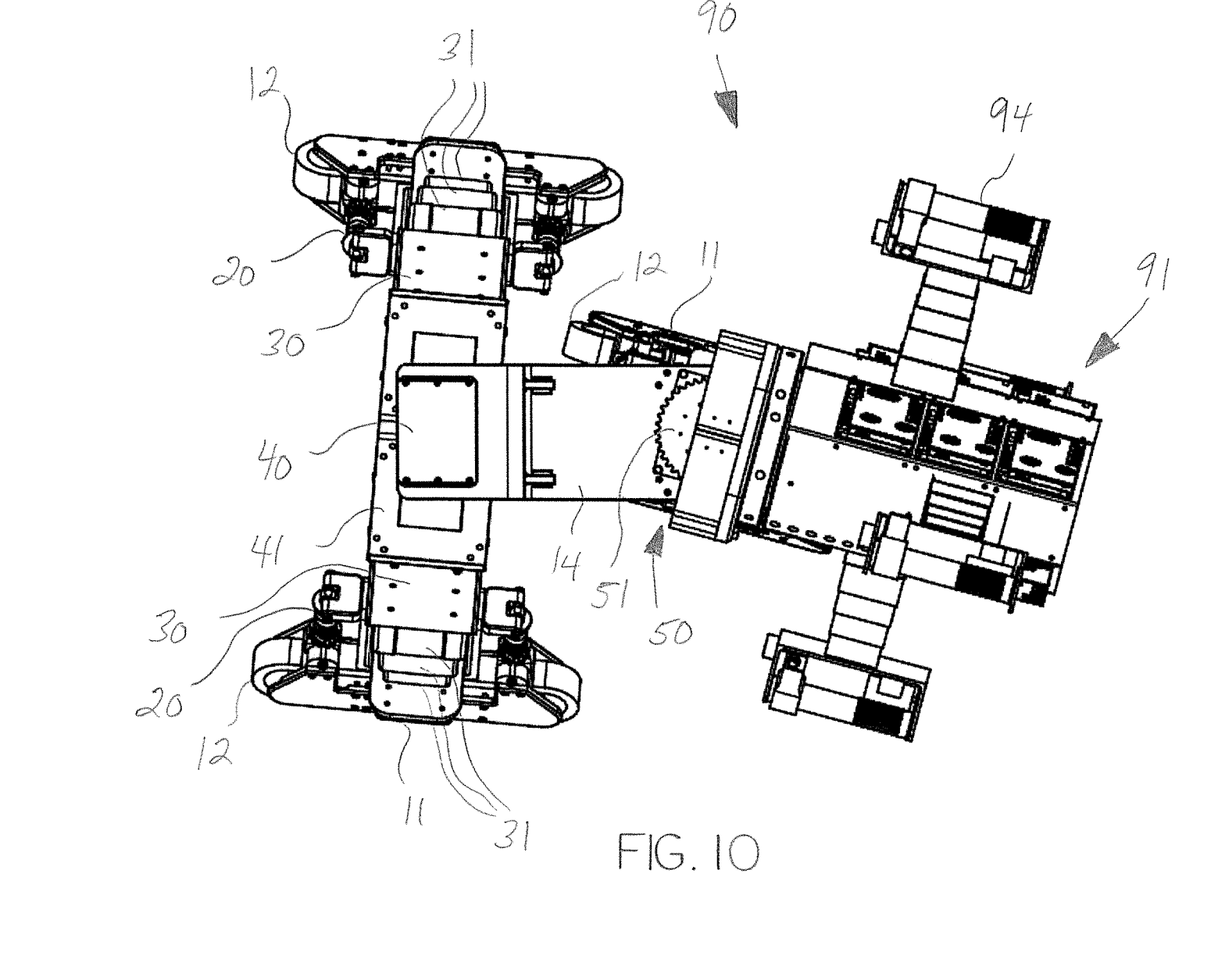
FIG. 10 is a top view of the embodiment of FIG. 6 showing the horizontal articulating joint mechanism with the bridging member in an angled orientation.

In the embodiment illustrated in FIGS. 6 through 10 wherein the operational components 91 are mounted to the rear of the transport assembly 10, the track sets 11 are mounted to and joined by a bridging member 14, which is preferably an articulating member as shown, the bridging member 14 being controlled by an articulating joint mechanism 50. The articulating joint mechanism 50 is designed and structured such that the relative angular position of the two track sets 11 may be horizontally adjusted as shown in FIGS. 9 and 10 such that the direction of travel of each track set 11 is different in order to accommodate bends in the pipe 100. The articulating joint mechanism 50 may comprise a toothed gear 51 operated by a motor or similar actuator, or any other suitable mechanism, or may be free moving in response to changes in pipe orientation. The articulating joint mechanism 50 may be utilized in combination with one or two track set rotational mechanisms 40 and/or one or two linear translation mechanisms 60.

The various articulating, pivoting, rotating and translating mechanisms 30/40/50/60 are all independently controlled such that any single mechanism or any combination of mechanisms may be actuated to ensure concentric positioning of the operational components 91 of the pipe lining apparatus 90 and the pipe 100 depending on the pipe orientation that is encountered. Alternatively, certain of the articulating, pivoting, rotating and translating mechanisms 30/40/50/60 may be uncontrolled, i.e., freely responsive to changes in pipe orientation. Sensor devices of suitable known type, such as proximity sensors, cameras, LIDAR or the like are utilized to provide data to one or more processing units to control the articulating, pivoting, rotating and translating mechanisms 30/40/50/60. This control is most preferably autonomous, but manual control by human operators (or manual override) may be utilized.

It is contemplated that equivalents and substitutions for certain elements set forth above may be obvious to those of ordinary skill in the art, and therefore the true scope and definition of the invention is to be as set forth in the following claims.

I claim:

1. A pipe lining apparatus comprising:
    operational components applying lining material and/or reinforcing filaments to an interior of a pipe;
    a transport assembly comprising two track sets, each said track set comprising a pair of laterally separated tracks connected to at least one extraction/retraction mechanism, said track sets connected to said operational components;
    at least one linear translation mechanism moving one or more of said track sets laterally relative to said operational components; and
    a single track set rotational mechanism connected to each said track set and having a vertical axis, whereby said track sets rotate about said vertical axis relative to said operational components.

2. The apparatus of claim 1, wherein said tracks are connected to said extension/retraction mechanism by a rocker mechanism.

3. The apparatus of claim 1, wherein said track sets are connected to a bridging member.

4. The apparatus of claim 3, further comprising an articulating joint mechanism dividing said bridging member into two articulating segments.

5. The apparatus of claim 1, wherein each of said extension/retraction mechanisms and each of said track set rotational mechanisms operate independently of each other.

6. The apparatus of claim 1, wherein each of said extension/retraction mechanisms, each of said track set rotational mechanisms, and each of at least one linear translation mechanism operate independently of each other.

7. The apparatus of claim 1, wherein said operational components are positioned between said track sets.

8. The apparatus of claim 4, wherein one of said track sets is positioned between said operational components and the other of said track sets.

9. A pipe lining apparatus comprising:
    operational components applying lining material and/or reinforcing filaments to an interior of a pipe, said operational components having a central axis, wherein said operational components apply said lining material and/or reinforcing filaments to the interior of the pipe in an orbital manner centered on said central axis;
    a transport assembly comprising two track sets, each said track set comprising a pair of laterally separated tracks connected to at least one extraction/retraction mechanism, said track sets connected to said operational components;
    a track set rotational mechanism connected to each said track set and having a vertical axis, whereby said track sets rotate about said vertical axis relative to said operational components;
    at least one linear translation mechanism moving one or more of said track sets laterally relative to said central axis of said operational components;
    wherein said transport assembly adjusts the position of said central axis of said operational components within the pipe such that said central axis is concentric with said pipe.

10. The apparatus of claim 9, wherein said tracks are connected to said extension/retraction mechanism by a rocker mechanism.

11. The apparatus of claim 9, wherein said at least one extraction/retraction mechanism comprise telescoping sleeve members.

12. The apparatus of claim 10, wherein said at least one extraction/retraction mechanism comprises telescoping sleeve members.

13. The apparatus of claim 9, wherein said at least one linear translation mechanism comprises a turn screw actuated by a motor, said turn screw retained by a mounting bracket connected to said operational components, and a platform connected to said turn screw and to at least one of said track sets, whereby rotation of said turn screw moves said turn set laterally relative to said central axis.

14. The apparatus of claim 10, wherein said at least one linear translation mechanism comprises a turn screw actuated by a motor, said turn screw retained by a mounting bracket connected to said operational components, and a platform connected to said turn screw and to at least one of said track sets, whereby rotation of said turn screw moves said turn set laterally relative to said central axis.

15. The apparatus of claim 11, wherein said at least one linear translation mechanism comprises a turn screw actuated by a motor, said turn screw retained by a mounting bracket connected to said operational components, and a platform connected to said turn screw and to at least one of said track sets, whereby rotation of said turn screw moves said turn set laterally relative to said central axis.

16. The apparatus of claim 12, wherein said at least one linear translation mechanism comprises a turn screw actuated by a motor, said turn screw retained by a mounting bracket connected to said operational components, and a platform connected to said turn screw and to at least one of said track sets, whereby rotation of said turn screw moves said turn set laterally relative to said central axis.

17. The apparatus of claim 9, wherein each of said extension/retraction mechanisms and each of said track set rotational mechanisms operate independently of each other.

18. The apparatus of claim 9, wherein each of said extension/retraction mechanisms, each of said track set rotational mechanisms, and each of said at least one linear translation mechanism operate independently of each other.

\* \* \* \* \*